May 5, 1942.   S. A. BENNETT   2,281,553
VARIABLE CYCLE TIMER
Filed Feb. 15, 1938   2 Sheets-Sheet 1
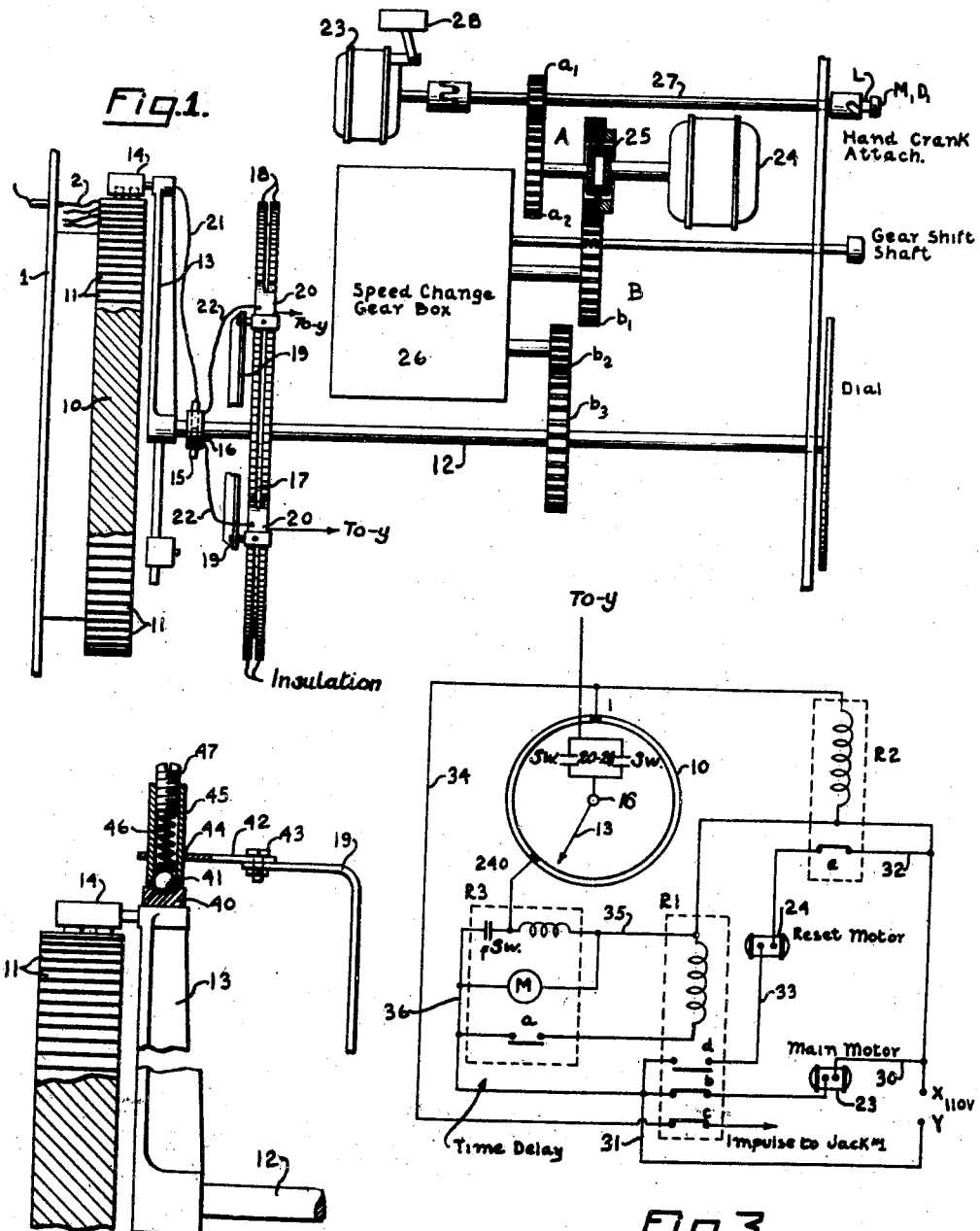
INVENTOR
STANTON A. BENNETT
BY
Ira L. Nickerson
ATTORNEY

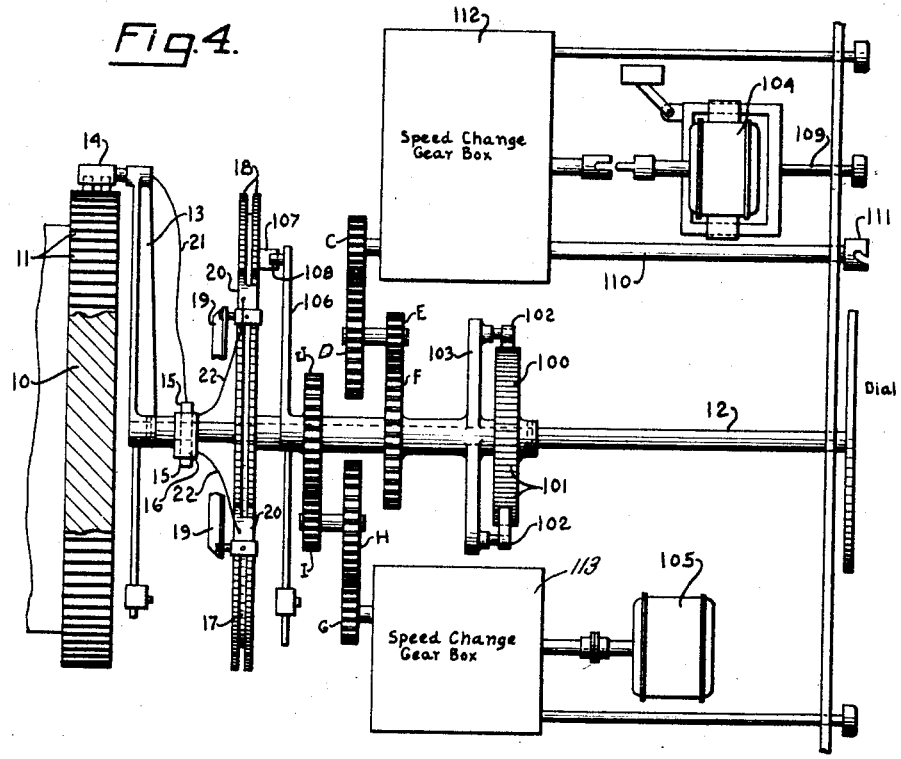
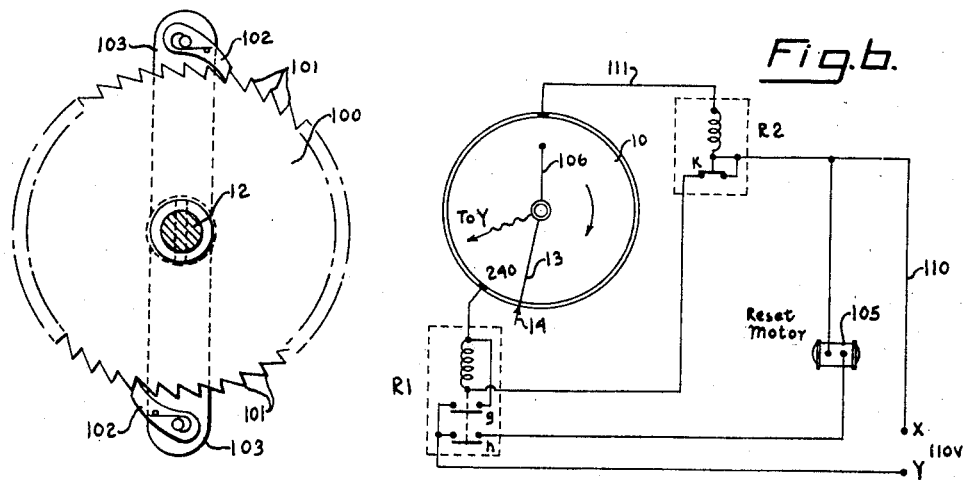

Patented May 5, 1942

2,281,553

UNITED STATES PATENT OFFICE 2,281,553

VARIABLE CYCLE TIMER

Stanton A. Bennett, Braintree, Mass., assignor, by mesne assignments, to Houdry Process Corporation, Wilmington, Del., a corporation of Delaware Application February 15, 1938, Serial No. 190,562

11 Claims. (Cl. 161—1)

This invention relates to regulating apparatus for controlling industrial processes which are to be carried out in a definite time and sequence of steps.

In numerous classes of manufacture, the method or process of developing the particular desired result must be carried out in a series of timed steps until the cycle of steps has been completed and the particular process concluded. The separate steps of the cycle denote a particular function of the process apparatus, which function may be the actuation of valves or other control elements of the apparatus.

The apparatus for carrying out any process may be of simple design and have but few control elements, or it may take the form of a complicated structure consisting of a series of interrelated units having numerous elements to be controlled in carrying out the separate steps of an intricate process.

In any apparatus, the most efficient time period for carrying out any desired process may readily be determined through experience and the control elements set to automatically function at definite periods during the cycle time of the process. However, and in the more complicated processes, new developments are made and changing operating conditions occur which alter the time for the completion of a process, or processes having different time cycles may be practised on parts of any given apparatus.

The main object of the invention is to provide a timing mechanism adaptable for controlling and maintaining the continuity of the sequence of steps of processes having varying time cycles.

Still another object of the invention is to provide a timing mechanism adaptable to recurrently control any process in a predetermined time.

A more specific object of the invention is to provide a timing mechanism having a plurality of control elements for the process steps, adaptable to control various timed processes, which recurrently control the same step of a particular process.

Another object of the invention is to provide a timing mechanism having a plurality of equally spaced controls for carrying out the steps of a process.

Other objects of the invention will be evident from the detailed description which follows, in the light of the accompanying drawings, of which:

Fig. 1 is a plan view, partly in section, of the preferred arrangement of my timing apparatus;

Fig. 2 is an elevation of a detail of the invention;

Fig. 3 is a wiring diagram of the main embodiment of the invention showing the various relays and control switches;

Fig. 4 is a view similar to Fig. 1 but showing a modification of the invention;

Fig. 5 is a detail of the modification; and

Fig. 6 is a wiring diagram of the modification.

In Fig. 1 of the drawings is shown one particular embodiment of the invention in which 10 designates a timing disc in the form of a commutator having disposed about its periphery in equally spaced relation a group of insulated actuating segments 11. In the arrangement shown the invention is adapted to be motivated by electrical energy, although conceivably mechanical, pneumatic or other energy might be utilized as the force for carrying out this invention. The segments 11 may be supplied with wire connections 2, which extend through a switchboard indicated at 1 and terminate in jacks or similar devices to which the control elements of an apparatus may be readily connected.

The commutator in the present embodiment is provided with 360 equally spaced segments, as this definite number is particularly adapted for the control of processes having varied time cycles and also processes having numerous operations to be controlled at closely timed intervals. However, more or less segments may be utilized depending upon the operating conditions in which it is to be used.

A shaft generally designated by numeral 12 is concentrically disposed in front of the commutator and has affixed thereto the various working parts of the apparatus which will later be described. At the front end of the shaft adjacent the commutator is fixed a counterweighted arm 13 carrying an electrical contact brush 14 which is so disposed as to contact the various segments of the commutator. A collector ring 15 is fixed to this shaft adjacent the arm 13 and a contact brush 16 cooperates therewith.

With a commutator having such a large number of segments, it is necessary to make provisions for a quick make and break contact of the brush 14 with the segments. In the present device this may take the form of a plate 17 having fixed to either side circular notched discs 18 of insulating material such as Bakelite or hard rubber. Each disc is provided with a notch for each commutator segment so that contact may be made and broken at each segment. At 19 is shown an angle plate carrying switches 20 which are adapted to ride over the notched disc to make and break the circuit to the brush arm 14 at each crest on the disc. Two switches 20 are provided, one acting as a spare for the other to assure current supply to the segments 11. A wire 21 connects the contact brush 14 with the collector brush 16 and wires 22 connect the brush 16 with switches 20. Power from a source $y$ is fed to switches 20 for carrying an impulse to the commutator segments through the contact brush 14.

The shaft 12 is adapted to be rotated alternately by two synchronous motors 23 and 24. The motor 23 may be designated as the main motor in that its function is to rotate the shaft at a fixed number of revolutions per minute for rotating the brush arm 13 through the desired cycle. The motor 24 may be designated as a reset motor for driving the brush arm upon the completion of a cycle of operation rapidly to its starting segment and the two motors are interconnected through the medium of differential gear 25. The motor 23 is connected with the differential gear through a suitable gear train generally designated at A and the differential gear is connected with the shaft 12 by suitable gearing generally indicated at B. The reset motor is directly connected with the differential gear 25 and as aforesaid the motors are adapted to alternately drive the shaft 12. A suitable speed changing gear box 26 may be provided for varying the ratio between the gears for changing the speed of the shaft.

The shaft 27 to which the gear $a_1$ is fixed may be driven by hand and for this purpose is provided at its free end with a bayonet slot. A lever generally indicated at L and disposed below the shaft 27 is provided for declutching the motor 23. The button 28 is used for switching from manual to automatic control.

The relationship of the respective parts of the apparatus can best be explained by arbitrarily selecting a speed at which the motors 23 and 24 through the gear trains will alternately drive the shaft 12. The main motor 23 may be assumed to make 1 R. P. M. and the reset motor to make 60 R. P. M. The gear wheels $a_1$ and $a_2$ of train A and the gear wheels $b_1$, $b_2$ and $b_3$ of train B are so related that shaft 12 is driven by the low speed motor one revolution in 90 minutes or $\frac{1}{90}$ revolution per minute. With a commutator having 360 segments, the time period between successive segments will be 15 seconds. If a particular process has a cycle time of 90 minutes it could be practised with the above timing arrangement without any adjustment whatever and by the use of only one driving motor and each time the cycle of operation would begin on the same starting segment and the same actuating segments function to operate the control elements.

If the cycle time of a process is less than 90 minutes and it is desired to use the same actuating segments for the particular elements to be controlled during each cycle, the contact brush must return to the starting segment within the same period of time from the beginning of the process cycle.

For the purpose of further explaining the function of this invention there has been arbitrarily chosen a process having a cycle time of 60 minutes although it will be readily appreciated from the explanation which follows that the apparatus is adaptable to control processes having various time cycles.

Assume the drive shaft 12 to be driven by the 1 R. P. M. motor and selected gear trains, as above described, the brush arm 13 will rotate at $\frac{1}{90}$ R. P. M. or from the starting segment back to the starting segment in 90 minutes.

With the 60 minute cycle process the brush arm must arrive at the starting segment from the beginning of the cycle in 60 minutes. Considering segment 1 as the starting segment and all or some of the segments connected to a control element, the main motor will drive the arm at the rate of 15 seconds between segments until the 240th segment is reached. Actually the time consumed is 59 minutes and 45 seconds or 15 seconds for each space travelled between adjacent segments from segments 1 to 240. The remaining 15 seconds of the 60 minute cycle is used to rotate the brush arm over the remaining segments to the first segment in readiness to begin a new cycle.

By reference to Fig. 3, which shows a wiring diagram including the various switches and relays, the commutator 10 is diagrammatically shown and for the safe of clarity only two actuating segments are indicated, the first or starting segment and the arbitrarily selected segment number 240 of a commutator having 360 segments. The several switches are shown in the position which they would occupy when the cycle has begun from the first segment and the main motor 23 is driving the control arm 13.

Power to the circuit is supplied by the "Bus" lines X and Y. The normal driving motor 23 is directly connected with "Bus" X by wire 30 and with "Bus" Y by wire 31; a switch $b$ is interposed in this circuit. The reset motor 24 is connected to "Bus" X by wire 32 and this motor circuit is completed to "Bus" Y by wire 33. This circuit is equipped with switches $d$ and $e$. A wire 34 connects relay $R_2$ which controls switch "$e$" to reset motor 24, and this wire also leads to the first impulse jack which is connected with the first or starting segment. A switch $c$ is interposed in this line for controlling the impulses from the starting segment.

The predetermined segment, in the present case, number 240, is connected to "Bus" X through wire 35 and to "Bus" Y directly through brush arm 13. A relay $R_1$ is interposed in the circuit and controls switches $b$, $c$, $d$. A time delay relay $R_3$ is connected with segment 240 and and controls switch $a$ and holding switch $f$.

With the above described diagram in mind and the various switches in the position shown in the figure the apparatus will function for the selected process in the following manner.

The main motor driving the contact brush arm over the segments of the commutator is energized from "Bus" line X through closed contact $b$ of deenergized relay $R_1$ to the Y control. During the time the main motor is driving arm 13 from segment 1 to segment 240 the relays $R_1$ and $R_3$ will be deenergized. While the arm 13 is in contact with segment 1 the relay $R_2$ is energized and switch E, controlled by this relay, is open. When the arm 13 leaves segment 1, relay $R_2$ becomes deenergized and switch E is closed. The time relay $R_3$ may be provided with a synchronous motor M in order to run continuously as long as power is delivered to bus lines X and Y.

After the cycle has started from segment 1 and the control arm 13 travels at a constant speed over the segments of the commutator, those segments which are connected to control elements of the apparatus become energized and actuate the particular elements to perform their respective functions. The speed at which the arm travels and consequently the period required for the arm to pass between adjacent segments may be determined for any particular cycle and, in order that the control elements may always be actuated by the same segments, it is necessary to return the arm to the starting segment from the last segment of a cycle in at least the time required to pass the arm from one segment to an adjacent segment in order that the continuity of the process can be maintained.

When the 240th or last segment of the selected cycle is reached, the relay $R_3$ becomes energized and switch $a$ of this relay is closed and also switch $f$, the latter acting as a holding switch to maintain the relay $R_3$ energized after the brush arm passes segment 240. The closing of switch $a$ by the $R_3$ relay energizes the relay $R_1$ controlling the switches $b$, $c$, $d$, and $d$ to the reset motor is closed while switch $b$ to the main motor is opened as well as switch $c$ to the first jack of the switchboard. The delay relay is set for the time period required for the brush to pass between two adjacent segments when driven by the main motor. Upon closing of switch $d$ to the resetting motor 24, this motor through the differential gear 25 and gear train B rotates the shaft 12 and brush arm 13 at a much greater speed than motor 23 in order to return the brush to the starting segment within the time period required for the brush to pass between adjacent segments when normally driven by the motor 2c.

There is no necessity for an exact relationship in the speeds of motors 23 and 24 to exist for any given time cycle, the only requirement being that the contact brush must be returned by the reset motor from the last desired segment of a cycle to the starting segment at least within the time required by the normal driving motor to advance the brush one segment. By providing a time delay relay in the circuit, a latitude of choice of speeds for the reset motor is made possible.

In the particular example, or a process of 60 minutes selected, and with a constant speed motor of 1 R. P. M., the contact brush is driven at the rate of $\frac{1}{90}$ R. P. M. or one revolution in 5400 seconds. With a commutator having 360 segments, the brush arm would be driven at a rate of 1 segment in each 15 seconds. In order now to return the arm from the last or 240th segment to the starting or first segment within the 15 seconds period, a reset motor of say 60 R. P. M. is used to drive the contact brush arm back to the starting segment and this would occur in $\frac{1}{3}$ of 15 seconds or 5 seconds. When the brush reaches the starting segment, the trip relay $R_2$ is energized which opens switch $e$ and stops the reset motor. When the 240th segment was reached, and the relay $R_1$ was energized, the switch $c$ to the first jack of the switchboard was opened and no current could flow from the starting segment to this jack to actuate its control element and the time delay relay $R_3$ was also energized and the time period for which it was set must expire before current could flow to jack 1. Consequently, when the brush reached the first segment in less than 15 seconds, the cycle could not begin until the starting segment was reenergized by the time relay $R_3$. When this occurs the impulse from contact brush 14 is carried through the first actuating segment to the control element with which it is connected and the cycle of operation is repeated.

In Fig. 2 of the drawings, there is shown a detail of the invention which provides an arrangement for accurately aligning the brush with the first or starting segment after it is returned by the reset motor. The device comprises a cup 40 fixed to the brush arm 13 and rotatable therewith. A ball 41 is adapted to cooperate with the cup and they form together a ball and cup joint. The ball 41 is maintained in fixed position by means of an arm 42 rigidly secured to the stationary mounting bracket 19 by suitable bolts 43 and the arm 42 is apertured at 44 to receive a sleeve 45 for holding the ball 41. A spring 46 is fitted within the sleeve for resisting upward movement of the ball, and a screw 47 may be provided for adjusting the tension of the spring to maintain the ball in operative relation with the cup.

In Fig. 4 is shown a modified arrangement for carrying out my invention and differs from the main embodiment only in the manner of accomplishing the resetting of or driving the brush to its original starting segment. In this figure, 10 denotes the commutator provided with the equally spaced segments 11 on its periphery and 12 the shaft for rotating the counterweighted arm 13 carrying the contact brush 14. The collector disc 15 and cooperating brush 16 are shown connected to switches 20—20 carried by the mounting angle 19 and riding over the periphery of the disc 17 fixed to shaft 12 carrying toothed annuli 18—18 for making and breaking the impulse to the segments 11. All these parts are the same as in the main embodiment.

In the modification, the contact brush arm 13 is driven at a constant speed over a portion of the commutator through the medium of a ratchet clutch on the drive shaft by the main motor and after the desired segment is reached the reset motor drives a resetting arm at a higher speed and interrupts the contact brush arm to quickly carry it to the starting segment.

The shaft 12 has a ratchet 100 fixed thereto and it is provided on its periphery with teeth 101 adapted to cooperate with driving pawls 102—102 carried by the ratchet arm 103. The main motor 104, driven at one R. P. M., is connected to gear wheel C which is driven at 1 R. P. M. Gears D, E and F are so proportioned that gear F is driven at the rate of $\frac{1}{60}$ R. P. M. Gear F is loosely mounted on shaft 12 and is formed integral or otherwise connected with ratchet arm 103 which rotates therewith driving the ratchet 100, through pawls 102. The ratchet 100 is fixed to shaft 12 and, through the shaft, arm 13 is driven at the rate of 15 seconds between segments.

The reset motor 105 is a 60 R. P. M. motor and drives gear G at this speed. Gear wheels H, I and J are so proportioned that gear J is driven at 36 R. P. M. Gear J is loose on shaft 12 and is directly connected to reset arm 106 and drives it at the rate of 36 R. P. M. or one revolution in 15 seconds.

The make and break disc 17 and the reset arm are provided with cooperating elements which may take the form of rubber extensions 107 and 108 respectively on the members and which, as the reset arm rotates, will contact each other and cause rotation of the disc 17. The disc 17 is, as before mentioned, fixed to shaft 12. The ratchet clutch 100 permits the shaft to rotate at the increased speed, the pawls 102 riding over the teeth 101 as the disc 17 is rotated by the reset arm.

The contact brush arm 13 is rotated at the increased speed through the shaft 12.

If, for any reason, it is desired to manually drive the shaft at the normal speed, the main motor 104 may be declutched from the shaft drive through the shaft 109, and the shaft 110 directly connected to gear wheel C may be manually operated. The free end of shaft 111 is provided with a bayonet connection to receive a suitable crank handle.

The drives for both the motors may be provided with speed changing gear boxes generally indicated at 112 for the normal driving motor and 113 for the reset motor drive. By varying the gear ratio for each drive, both motors may be adapted to drive at an increased or decreased speed, depending on operating conditions.

In Fig. 6 is shown a wiring diagram of the modification including the various switches and relays for accomplishing the purpose of the invention. The main motor is not shown in the diagram since it runs continuously at the desired speed for any given cycle and is not interrupted when the reset motor carries out its function.

For the sake of simplicity, consider the process cycle to be the same as the example used in explaining the main embodiment of the invention, that is, the main motor is set to drive the contact brush arm 13 one revolution in 90 minutes and the particular process cycle which the apparatus is to control is of 60 minute duration. With a commutator having 360 equally spaced segments, the brush will have travelled from segment 1 or the starting segment to the 240th segment at the rate of 15 seconds between segments or over 239 segments for an elapsed time of 59 minutes and 45 seconds.

Now, in order that the continuity of each cycle may be maintained, the brush arm 13 must be at the starting segment and begin a new cycle within the 15 seconds period. The reset arm 106 will always be driven from the starting segment through one complete revolution, and, during the course of its rotation, the contact brush arm is interrupted by the reset arm and quickly carried to the starting segment. With a 60 R. P. M. reset motor, the reset arm will make 36 revolutions per minute or one revolution in 15 seconds, and, consequently, the brush arm 13 will return to the starting segment exactly at the end of 15 seconds.

Referring now to Fig. 6, which shows the switches in their position when the main motor is driving, the contact brush arm 13 is directly connected to "Bus" Y and the starting segment is connected to "Bus" X through wire 110, relay R₂ and the wire 111 and the circuit completed. The brush arm 13 is revolved at the rate of 15 seconds between segments until it reaches the last desired segment of the cycle or, in the present example, No. 240, at which time relay R₁ is energized closing switches $g$ and $h$. Switch $h$ closes the circuit to the reset motor 105 which begins the rapid rotation of reset arm 106. Contact brush arm 13 continues its rotation and passes segment 240 but switch $g$ is a holding switch and the circuit to the reset motor 105 remains closed after the brush 14 passes segment 240. Some time after the reset arm begins its rotation, it interrupts the rotation of contact brush arm 13 beyond the 240th segment and returns it to the starting segment exactly 15 seconds after the reset arm has started from the starting segment. The brush 14 makes an impulse at the starting segment to relay R₂ which opens switch $k$ and breaks the reset motor circuit. When switch $k$ is opened, the relay R₁ becomes deenergized and opens switches $g$ and $h$, breaking the circuit to the reset motor 105 and the main motor which is always running starts brush arm 13 through a new cycle.

It will be apparent that numerous changes and modifications of detail can be made without departing from the spirit of the invention which is not to be limited by the specific description but only by the appended claims.

What I claim is:

1. In an electrical control device for regulating the timed cycle of industrial processes, the combination of a time switch element having a plurality of control segments on its periphery and a cooperating contact brush, a motor means for driving the brush arm through a portion of a revolution at a constant speed to a selected segment, and a second motor means for driving the brush arm at an increased speed through the remainder of the revolution from the selected segment and means controlled by said segment for stopping the first mentioned motor means and starting the second mentioned motor means.

2. In an electrical control device for regulating the timed cycle of an industrial process, the combination of a time switch element having a plurality of equally spaced control segments disposed about its periphery, and a cooperating contact brush, a motor for rotating the brush from a starting segment of the time switch element at a constant speed to a predetermined segment, means controlled by the last named segment for stopping said motor, a second motor for driving the brush at increased speed from the predetermined segment to the starting segment, and means controlled by said predetermined segment for starting said second motor.

3. In an electrical control device for regulating the timed cycle of an industrial process, the combination of a time switch element having a plurality of equally spaced control segments disposed about its periphery, and a cooperating contact brush, a low speed motor and a high speed motor for rotating the brush from a starting segment through one revolution to the starting segment, said low speed motor being adapted to rotate the contact brush to a selected segment, means associated with the last named segment for stopping the low speed motor and starting the high speed motor, said high speed motor moving the brush from the selected segment to the starting segment in at least the time the low speed motor moved the contact brush from one segment to an adjacent segment.

4. In an electrical control device for regulating the timed cycle of an industrial process, the combination of a time switch element having a plurality of equally spaced control segments disposed about its periphery, and a cooperating contact brush, a low speed motor and a high speed motor for rotating the arm from a starting segment through one revolution to the starting segment, said first motor being adapted to revolve the brush from a starting segment over a predetermined number of segments to a selected segment at a constant period of time between each segment and said second motor being adapted to revolve the brush to the starting segment in at least the time period required for the said first motor to move the arm between two adjacent segments, and means controlled by said selected segment for stopping said first motor and starting said second motor.

5. A device for regulating recurring process cycles which comprises a stationary timing disc having a series of control elements disposed about its periphery for initiating the operation of mechanisms to carry out the steps of the process, said elements including a starting element for beginning the cycle and a selected element for ending the cycle, a rotatable contractor for said elements, a low speed motor and a high speed motor, independently operable driving means connecting each of said motors with said rotatable contractor, said low speed motor being adapted to revolve the contractor at a constant rate from the starting element at least to said selected element, means controlled by the selected element for starting the high speed motor, said high speed motor being adapted to advance the contactor to the starting element at a faster rate than that of the low speed motor, and means controlled by the starting element for stopping the high speed motor.

6. In a device for regulating the timed cycle of an industrial process the combination of a stationary timing disc having equally spaced control segments disposed about its periphery, and a cooperating rotatable arm, a low speed motor and a high speed motor, and differential gearing interconnecting said motors for successively rotating said arm, said low speed motor rotating the arm from a starting segment for a predetermined portion of a revolution to a selected segment and said high speed motor completing the rotation of the arm through its revolution at a greater speed from the selected segment to the starting segment and means associated with the selected segment for stopping the low speed motor and starting the high speed motor.

7. In a device for regulating the timed cycle of an industrial process the combination of a stationary timing disc having equally spaced control segments disposed about its periphery, and a cooperating rotating arm, a low speed motor and a high speed motor, and differential gearing interconnecting said motors for successively rotating said arm, said constant speed motor rotating the arm from a starting segment to a predetermined segment of the timing disc, means associated with said last mentioned segment for stopping the low speed motor and starting the high speed motor, said high speed motor revolving the arm at an increased speed to the starting segment.

8. In an electrical control device for regulating the timed cycle of an industrial process, the combination of a time switch element having a plurality of equally spaced control segments disposed about its periphery, and a cooperating contact brush, a low speed motor and a high speed motor, and differential gearing interconnecting said motors for successively rotating said brush, said first motor rotating the brush from a starting segment to a predetermined segment at a constant time period between adjacent segments, means associated with the predetermined segment to stop the low speed motor and start the high speed motor, said high speed motor returning the brush to the starting segment in at least the time required for the constant speed motor to drive the brush between adjacent segments.

9. In a device for regulating the timed cycle of an industrial process, the combination of a stationary timing disc and a cooperating rotating arm, a drive shaft for the arm carrying a ratchet clutch, a motor for rotating said shaft and clutch at a constant speed, a second arm loosely mounted on the shaft and a second motor for rotating said second arm at a speed greater than said first mentioned arm and means for interrupting the first arm by said second arm for increasing the speed of rotation of the first arm.

10. In a device for regulating the time cycle of an industrial process, the combination of a stationary timing disc having spaced segments and a rotatable arm, said segments including a starting segment for beginning the cycle and a predetermined segment for ending the cycle, means for rotating said arm at a constant speed from the starting segment for a portion of a revolution to the predetermined segment, a second arm and means controlled by the predetermined segment for rotating said arm at a greater speed than that of the first arm when the predetermined segment is reached, said second arm interrupting the first arm and driving the same to complete its revolution to the starting segment at a greater speed, said starting segment being operable to stop the movement of the second arm.

11. In an electrical control device for regulating the steps of an industrial process cycle, the combination of a time switch element and a rotatable contact brush, said time switch element having disposed about its periphery at equally spaced points a plurality of electrical control segments, a low speed and a high speed motor for rotating said brush from one segment through a complete revolution, said low speed motor having an independent drive for rotating the brush at a constant speed from the first segment to a predetermined segment for carrying out the steps of a process, said high speed motor having an independent drive for rotating said brush at an increased speed from the predetermined segment to the first segment within the time period for the main motor to pass the brush over adjacent segments, means controlled by the predetermined segment for stopping the low speed motor and starting the high speed motor, and means associated with the brush for centering the same on the first segment upon completion of its revolution.

STANTON A. BENNETT.